United States Patent
Yang et al.

(10) Patent No.: US 8,457,078 B2
(45) Date of Patent: Jun. 4, 2013

(54) SIMULTANEOUS USE OF MULTIPLE PHONE NUMBERS IN MOBILE DEVICE BY SHARING HARDWARE

(75) Inventors: Hong-Kui Yang, San Diego, CA (US); Jing Su, San Diego, CA (US)

(73) Assignee: VIA Technologies, Inc., New Taipei (TW)

( * ) Notice: Subject to any disclaimer, the term of this patent is extended or adjusted under 35 U.S.C. 154(b) by 898 days.

(21) Appl. No.: 12/581,748

(22) Filed: Oct. 19, 2009

(65) Prior Publication Data

US 2011/0090874 A1   Apr. 21, 2011

(51) Int. Cl.
*H04B 7/216* (2006.01)

(52) U.S. Cl.
USPC .......................................... 370/335; 370/342

(58) Field of Classification Search
USPC .......................................................... 370/335
See application file for complete search history.

(56) References Cited

U.S. PATENT DOCUMENTS

| | | | |
|---|---|---|---|
| 7,299,037 B2 * | 11/2007 | Hospes | 455/419 |
| 7,551,596 B2 * | 6/2009 | Kim et al. | 370/349 |
| 2002/0041580 A1 * | 4/2002 | Shoji et al. | 370/335 |
| 2006/0177029 A1 * | 8/2006 | Dotan et al. | 379/114.01 |
| 2009/0088211 A1 * | 4/2009 | Kim | 455/558 |
| 2009/0212908 A1 * | 8/2009 | Lin et al. | 340/5.81 |
| 2009/0270072 A1 * | 10/2009 | Hsu et al. | 455/411 |
| 2010/0027534 A1 * | 2/2010 | Wu et al. | 370/355 |
| 2010/0231383 A1 * | 9/2010 | Levine et al. | 340/540 |
| 2010/0279698 A1 * | 11/2010 | Wong | 455/450 |

FOREIGN PATENT DOCUMENTS

| | | |
|---|---|---|
| CN | 101203005 A | 6/2008 |
| CN | 101222715 A | 7/2008 |

\* cited by examiner

*Primary Examiner* — Guang Li
(74) *Attorney, Agent, or Firm* — Richard K. Huffman; James W. Huffman

(57) ABSTRACT

Determining and simultaneously using a circuit for a mobile device couple to a base station, the circuit may comprise an identification signal detector for receiving a first identification signal corresponding to a first module and a second identification signal corresponding to a second module in the mobile device. The circuit may comprise a receiver for receiving a plurality of signals from the base station; said plurality of signals is configured to set up communication between the mobile device and the base station. The circuit may comprise a calculator for calculating a plurality of parameters in response to the first identification signal, second identification signal and said plurality of signals received from said base station. The circuit may also comprise a processor for attaching the first and second module to the base station simultaneously in response to a plurality of slots by time multiplexing and the plurality of parameters.

22 Claims, 12 Drawing Sheets

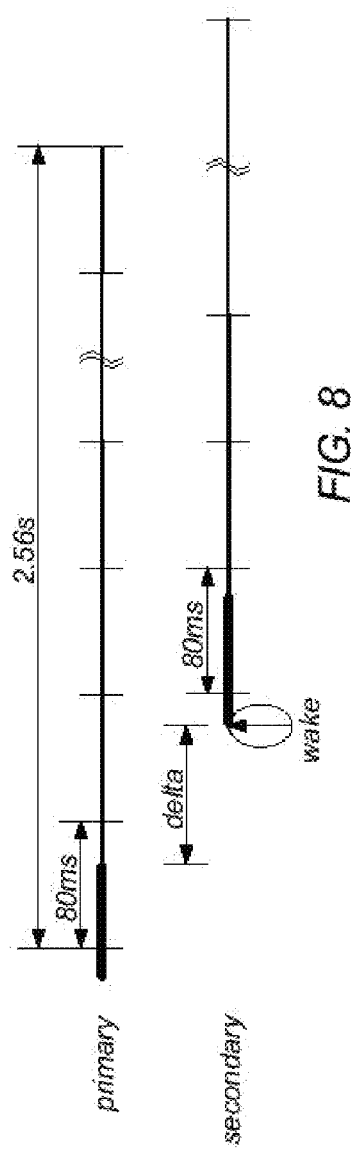
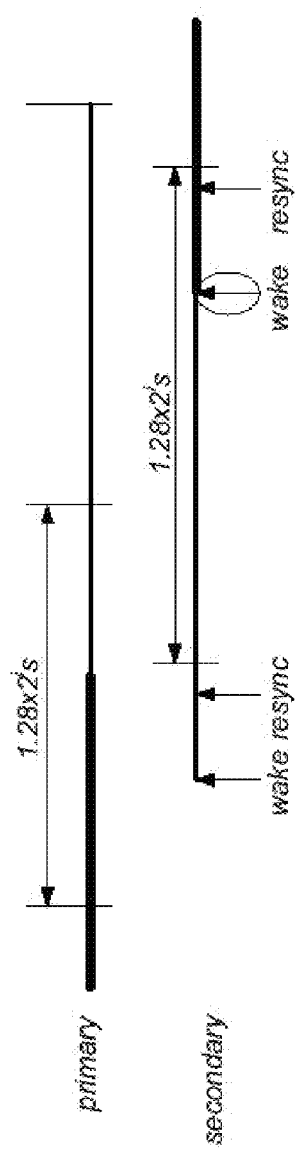
FIG. 8
FIG. 9

SIMULTANEOUS USE OF MULTIPLE PHONE NUMBERS IN MOBILE DEVICE BY SHARING HARDWARE

This application claims benefit of priority of U.S. provisional application Ser. No. 61/117,960, filed Nov. 26, 2008, which is hereby incorporated by reference in its entirety as though fully and completely set forth herein.

FIELD OF THE INVENTION

The present invention relates to the field of cellular networks, and more particularly to a system and method for simultaneous use of multiple cards in a mobile device.

DESCRIPTION OF THE RELATED ART

In recent years, the use of mobile devices and, in particular, cellular telephones has proliferated. In fact, some users maintain multiple cellular accounts and/or cellular phone numbers. For example, some cellular users may have a first account or number for personal phone calls and a second account or number for business phone calls. Alternatively, a user may have an account for a first region and a separate account for another region. In these cases, the user may have to carry multiple cell phones (e.g., one for each account), switch out cards (e.g., SIM cards) whenever a different account should be used, or use phones which allow multiple cards to be used in the same phone in order to use the multiple accounts. However, such phones do not allow the cards to be used simultaneously. Correspondingly, improvements in mobile communication and devices are desired.

SUMMARY OF THE INVENTION

Various embodiments are presented of a system and method for simultaneously using multiple cards in a mobile device. More specifically, the mobile device may include at least a first card and a second card.

One aspect of the invention is a method of a mobile device for wirelessly communicating with a base station, comprising receiving a first parameter set of a first subscriber and a second parameter set of a second subscriber; receiving a plurality of signals from the base station, wherein said plurality of signal is configured to indicate communication parameters between the mobile device and the base station; calculating a plurality of communication parameters for the first parameter set and the second parameter set according to the plurality of signals; and communicating with the base station in accordance with the plurality of communication parameters for representing the first subscriber and the second subscriber, wherein the plurality of communication parameters indicates wireless communication resource in a time multiplexing fashion.

One aspect of the invention is a circuit for a mobile device couple to a base station, the circuit comprising an identification signal detector for receiving a first identification signal corresponding to a first module and a second identification signal corresponding to a second module in the mobile device; a receiver for receiving a plurality of signals from the base station, said plurality of signals is configured to set up communication between the mobile device and the base station; a calculator for calculating a plurality of parameters in response to the first identification signal, second identification signal and said plurality of signals received from said base station; and a processor for attaching the first and second module to the base station simultaneously in response to a plurality of slots by time multiplexing and the plurality of parameters, wherein said plurality of parameters are configured to determine whether the second module is able to attach to the base station.

Another aspect of the invention is a system for operating in CDMA mode, the system comprising a base station for receiving a first parameter set and a second parameter set and a mobile device for wirelessly communicating with the base station.

the mobile device further comprising a parameter receiver for receiving the first parameter set of the first subscriber and a second parameter set of a second subscriber; a signal receiver for receiving a plurality of signals from the base station, wherein said plurality of signal is configured to indicate communication parameters between the mobile device and the base station; a calculator for calculating a plurality of communication parameters for the first parameter set and the second parameter set according to the plurality of signals; and a communication module for communicating with the base station in accordance with the plurality of communication parameters for representing the first subscriber and the second subscriber, wherein the plurality of communication parameters indicates wireless communication resource in a time multiplexing fashion.

First Application—Mobile Station

The method may determine a first international mobile subscriber identity (IMSI). The first IMSI may correspond to a first card or phone number in a mobile device. For example, the method may determine a telephone number associated with the first card and correspondingly determine the first IMSI based on the telephone number.

Similarly, the method may determine a second IMSI for a second card or phone number in the mobile device. For example, the second IMSI may be derived or determined from a telephone number associated with the second card (or the second account of the mobile device).

The method may determine if the first card and the second card are simultaneously usable by a single transmitter/receiver of the mobile device. In one embodiment, the determination may be performed by using the first IMSI and the second IMSI. For example, one or more parameters (e.g., communication parameters) may be determined for each of the first and second cards (e.g., based on the first IMSI and the second IMSI). The method may then determine if the parameters for the first card are compatible (or alternatively, conflict) with the parameters of the second card. If the parameters are compatible, then the first card and the second card may be simultaneously usable. The method may then accordingly configure the mobile device to simultaneously use both cards.

In one embodiment, the determination may be based on minimization of power consumption. For example, the determination may be based on whether the two cards can be used during the same time slot so that the mobile device may not use additional power to perform communication with both cards. More specifically, the mobile device may not have to time multiplex use of the first and second cards with the appropriate sets of parameters. Alternatively, the determination may be based on minimization of collisions. For example, instead of attempting to use both cards during the same time slot, the method may determine if the two sets of parameters result in the first card and second card being used in time slots a threshold amount away from each other, thus ensuring no collisions, but consuming more power. Thus, in this example, the method may include determining a first time slot of the first card based on the first IMSI, determining a second time slot of the second card based on the second IMSI, and determining if the first time slot and the second time slot are within a threshold amount of time.

As one specific example, a paging slot and channel number may be determined for each of the cards, e.g., based on the first and second IMSIs. If the paging slot of the first card and the paging slot of the second card are the same or adjacent and if the first channel number of the first card and the channel number of the second card are different, the method may determine that the parameters conflict, and correspondingly, the first and second cards are not simultaneously usable by the mobile device.

An indication or message may be provided, e.g., on a display of the mobile device, which indicates whether the first card and the second card are simultaneously usable by the mobile device.

If the first card and the second card are simultaneously usable by the mobile device, the method may include configuring the mobile device to simultaneously use both the first card and the second card. For example, operating the mobile device simultaneously may be performed by time multiplexing use of the first card and use of the second card using the single transmitter/receiver of the mobile device.

The method may be applied to one or more additional cards. For example, the one or more additional IMSIs may be determined for one or more additional cards. Similar to above, the method may determine if the additional cards are usable simultaneously by the mobile device (e.g., using a single or common transmitter/receiver) with the first and second cards, e.g., by determining corresponding sets of parameters for the additional cards. If these parameters are compatible, the indication may further indicate that the one or more additional cards are simultaneously usable by the mobile device.

The method described above may be implemented as a computer program, e.g., as program instructions stored on a memory medium (e.g., of the mobile device, or a different computer system, as desired). The program instructions may be executable to implement the method described above. Similarly, the method may be performed or implemented by a mobile device.

Second Application—Base Station

In one embodiment, a device may receive signals from a mobile device. For example, a base station (e.g., a macro base station or femtocell base station) may receive the signals from the mobile device. In one embodiment, the signals may be part of an initial communication or set up phase for establishing communication between the base station and the mobile device, although the signals may be received after communication has been set up, e.g., for a first card of the mobile device.

In some embodiments, the signals received from the mobile device may indicate that the mobile device is capable of using, or otherwise requests to use, two different cards simultaneously, although other methods of determining are envisioned. Thus, the method may determine that the mobile device is capable of using a first card and a second card simultaneously. Additionally, or alternatively, the signals may include information pertaining to the mobile device, the first card of the mobile device, the second card of the mobile device, etc. For example, the information may indicate the phone number(s) associated with the first card and/or the second card.

A plurality of first communication parameters may be determined for the first card. In some embodiments, the first communication parameters may be determined based on an international mobile subscriber identity (IMSI) of the first card. For example, the IMSI may be determined or derived based on a phone number associated with the first card.

A plurality of communication parameters may be determined for the second card based on the first communication parameters. However, the communication parameters for the second card may not be based on an IMSI associated with the second card. Instead, the communication parameters for the second card may be determined or selected in such a manner to ensure that the first and second cards can be used simultaneously, e.g., while conserving as much power as possible and/or ensuring as few collisions between using the first and second card as possible. Thus, in one embodiment, the determination of the parameters of the second card may not be based on a phone number associated with the second card (and/or any other information pertaining to the second card, which may have been received). Alternatively, an IMSI may be selected for the second card (e.g., which is not based on the phone number associated with the second card) which will result in communication parameters that are compatible with the communication parameters of the first card.

In further embodiments, an actual IMSI associated with the second card may be used, e.g., in part, to determine the communication parameters for the second card. However, if some of the communication parameters conflict with the parameters for the first card, they may be modified, e.g., by the base station, and/or a new IMSI may be used for the second card (e.g., instead of the one based on the phone number of the second card). The determined communication parameters for the first and second cards may allow the first card and the second card to be used simultaneously by a single transmitter/receiver of the mobile device.

For example, the determined parameters of the first card may include a first paging slot and a first paging channel. Correspondingly, the paging slot and the paging channel of the communication parameters of the second card may be assigned to the first paging slot and the first paging channel.

The first communication parameters may be provided to the mobile device. As indicated above, the communication parameters may be usable by the mobile device to communicate using the first card and the second card simultaneously.

The method described above may be extended to one or more additional cards (i.e., in addition to the first and second cards described above). Thus, the method may further include determining communication parameters for one or more additional cards. The parameters may be determined in order to ensure that all or at least a portion of the cards may be used simultaneously together, as desired. Correspondingly, these additional communication parameters may be provided to the mobile device.

The above described method may be implemented as a program, e.g., as program instructions stored on a memory medium. The program instructions may be executable to perform the method described above. Furthermore, the method may be implemented by a system, e.g., a base station, such as a macro cell base station, a femtocell, etc. Thus, the base station may ensure that a phone desiring to use more than one card simultaneously is able to do so effectively.

BRIEF DESCRIPTION OF THE DRAWINGS

A better understanding of the present invention can be obtained when the following detailed description of the preferred embodiment is considered in conjunction with the following drawings, in which:

FIGS. 3-11 are exemplary diagrams corresponding to the method of FIG. 2, according to various embodiments;

Figure 1:
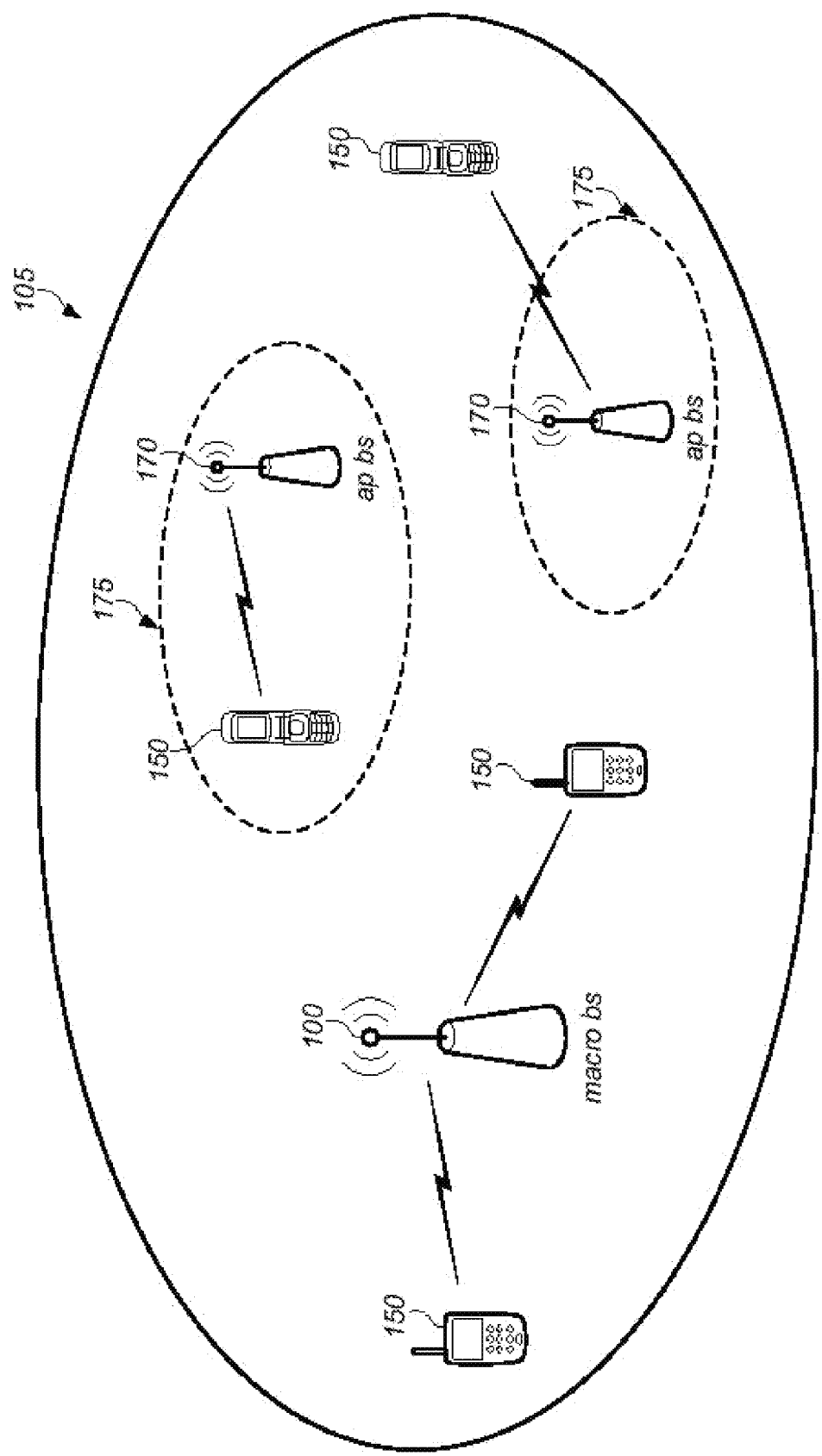
FIG. 1 is an exemplary communication system including an access point base station according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

FIG. 1—Exemplary Communications System

FIG. 1 illustrates an exemplary communication system including a macro base station 100 which provides service in macro area 105, a plurality of access point base stations 170 which provide service in local areas 175, and a plurality of mobile devices 150 (also referred to as "mobile stations" or "access terminals").

The term "access point base station" is intended to include typical definitions (as known by those of skill in the art) of femtocells, home base stations, personal access points (PAPs), and personal 2G-3G (or nG) base stations, among others. Similarly, the term "macro base station" is intended to include typical definitions (as known by those skilled in the art) of cell phone towers and base stations which provide service in a macro area. The term "base station" is intended to include both access point base stations and macro base stations among other types of base stations, as desired.

The mobile devices (also referred to as "access terminals") 150 may include any type of device which may be used in a cellular network, e.g., for RF communication. The mobile devices may include cellular (or cell) phones (including smart phones), personal digital assistants (PDAs) with mobile communication capabilities, laptops or computer systems with mobile communication components, and/or any device that is operable to communicate with a cellular network. The mobile devices may use various different protocols, e.g., CDMA2000 (1xRTT and EV-DO), UMB, UMTS, LTE, WiMAX, or others). Correspondingly, the base stations 100 and mobile devices 150 may support any or at least a subset of the protocols used by the mobile devices, e.g., without modification to the standards or protocols for supporting existing mobile devices. The mobile devices 150 may be configured to support simultaneous use of multiple cards, as described in more detail below.

Figure 2:
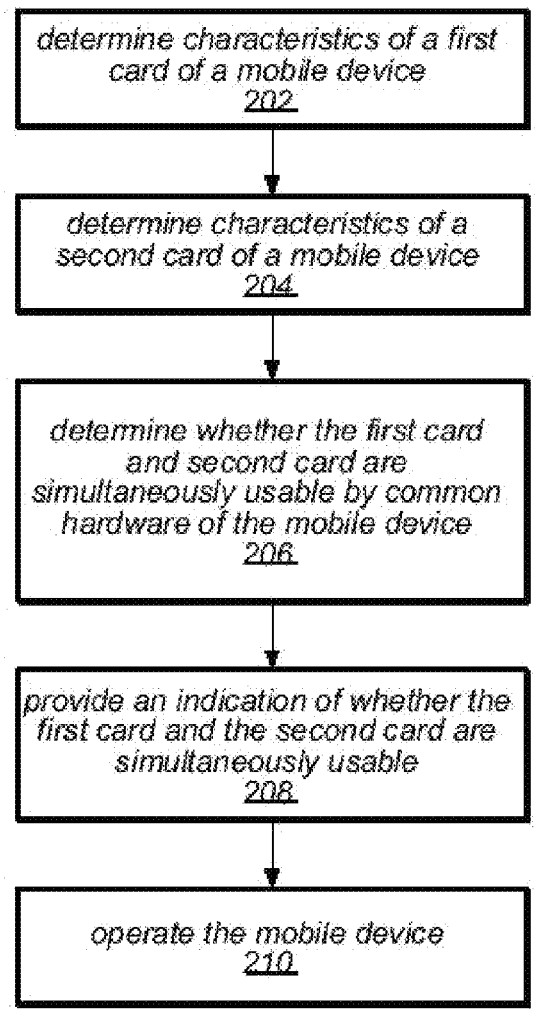
FIG. 2 is a flowchart of an exemplary method for determining if two cards can be used simultaneously in a mobile device, according to one embodiment.

FIG. 2—Determining Compatibility of Multiple Cards in a Mobile Device

FIG. 2 illustrates an exemplary method for determining compatibility of simultaneous use of multiple cards in a mobile device. The method shown in FIG. 2 may be used in conjunction with any of the computer systems or devices shown in the above Figures, among other devices. In various embodiments, some of the method elements shown may be performed concurrently, or in a different order than shown, or omitted. Additional method elements may also be performed as desired. As shown, this method may operate as follows.

In 202, characteristics of a first card of a mobile device may be determined. For example, a phone number of the mobile device may be determined, e.g., from the first card of the mobile device. In some embodiments, an international mobile subscriber identity (IMSI) may be determined for the first card of the mobile device. In various embodiments, the IMSI may be derived from the phone number (e.g., in the United States) associated with the first card of the mobile device, or according to different methods (e.g., associations stored in a database, which may be accessible over a network, such as in China), as desired. In general, IMSIs may be used to determine various communication parameters for performing communication by the mobile device, as described below In 204, similar to descriptions above in 202, characteristics of a second card of the mobile device may be determined. For example, an IMSI may be determined for the second card of the mobile device, e.g., by determining the phone number associated with the second card of the mobile device and deriving the IMSI from the phone number. The IMSI derived or otherwise determined from the second card may then be used to determine communication parameters associated with the second card, as described below, although other methods for determining communication parameters are envisioned. Alternatively, or additionally, the characteristics of the second card may be determined based on the characteristics of the first card. For example, some of the communication parameters determined from the first card may apply to the communication parameters of the second card.

In 206, the method may determine whether the first card and the second card are simultaneously usable by common hardware of the mobile device. For example, it may be determined if the first and second card can be used simultaneously by a single transmitter/receiver and/or baseband logic of the mobile device.

As used herein "simultaneously usable" (when used with respect to cards of the mobile device) refers to the mobile device providing first communication service to the user of the mobile device using the first card and also providing second communication service to the user of the mobile device using one or more additional cards, wherein the first communication service and the second communication service appear to the user as occurring at the same time. It should be noted that the mobile device hardware may actually be performing time multiplexing of use of the hardware of the mobile device. For example, the same hardware (e.g., transmitter/receiver) of the mobile device may be used for communication using the first card in a first time slot and again for communication using the second card in a second time slot, and this operation is considered "simultaneously usable" as used herein. Thus, while the first and second cards may not be used at the exact same instant (due to time slotting), the user may experience simultaneous use of the first and second cards, e.g., by using time multiplexing as described above, (although in other embodiments, the hardware may be used by both of the cards during the same time slot, as described herein). Thus, to the user, where two cards are "simultaneously usable", both cards can be used by the same hardware to perform two separate communications at the same time. Additionally, note that the "same hardware" referred to above is more specific than simply using the same mobile device. More specifically, the same hardware refers to hardware used for communication by the mobile device, such as baseband circuitry, the transmitter/receiver, etc. Thus, the mobile device may not require two separate communication circuits (e.g., two separate mobile baseband circuits, transmitter/receivers, etc.) to use the two cards simultaneously, but instead may use common communication hardware.

In 206, the method may include determining the one or more communication parameters associated with the first card and determining the one or more communication parameters associated with the second card. For example, an IMSI may be used to determine parameters such as the channel number (e.g., CDMA channel number), paging channel number, quick paging channel number, paging slot number, paging indicator positions, various time slots, etc. These parameters may determine how and when the mobile device communicates with a base station (e.g., a macro base station) when using the first card or account associated with the first card. Similarly, the parameters determined based on the second card (e.g., the IMSI associated with the second card) may be used to determine how and when the mobile device communications with the base station when using the second card or account associated with the second card. However, some of the parameters determined for the first card or first IMSI may apply to parameters determined for the second card or second IMSI. Other characteristics or communication parameters may be determined in 206 or at a later point, e.g., from a base station, such as the system time, pilot PN offset, long code state, etc.

Note that the communication parameters may be the same communication parameters that may be used in future communication sessions. For example, the determination of the communication parameters may be performed in the same manner (e.g., which may be a deterministic manner) that will be used when communicating with a base station. In one embodiment, the determination of the communication parameters may actually involve establishing a connection with a base station and receiving assigned communication parameters. Alternatively, the mobile device may be configured to determine the communication parameters without having to communicate with the base station, or any combination of the mobile device and the base station determining the communication parameters.

In one embodiment, the mobile device may utilize hardware or software stored on the mobile device to determine a portion or all of the parameters, e.g., based on an algorithm stored or implemented in the mobile device. It should be noted that some of the communication parameters may always be assigned in the same manner, and thus may always be assigned the same for each communication session. Thus, the determining of these communication parameters may be completely deterministic. However, some of the parameters may be assigned differently or may be based on exterior factors (e.g., such as other mobile devices using a base station), and thus, the determining of these parameters may not be absolute. For example, the channel number may be modified during future communication sessions with a base station (e.g., via overhead messages).

Once the communication parameters are determined for the first card and the second card, the method may determine whether these parameters are compatible or conflict with each other. For example, some parameters may not be compatible with each other and may result in the communication of the two cards always (or having a high or otherwise unacceptable probability of) conflicting with each other when used simultaneously. The determination of whether the sets of communication parameters are compatible may be based on minimization of power consumption with an acceptable probability of packet collisions. For example, since, as indicated above, some of the parameters may vary during assignment or initial set up of communication between the mobile device and the base station (such as channel numbers), there may be a non-zero probability of collisions, but the configuration may minimize power consumption. More specifically, the communication parameters may be acceptable for power minimization by selecting sets of parameters which have the same channel and paging slot, e.g., which use the same time slot.

Alternatively, power consumption may be sacrificed in order to guarantee minimization of collision rates. For example, communication parameters may be determined to be compatible when the paging slots are at least a threshold amount of time apart. More specifically, in one embodiment, a first time slot may be determined based on the IMSI of the first card and a second time slot may be determined based on the IMSI of the second card. The method may then determine if the first time slot and the second time slot are within a threshold amount of time to determine if the two sets of communication parameters (and thus, the two cards) are compatible. Thus, the power consumption may be much higher than the alternative described above, but may guarantee a low probability of collisions or zero collision rate. Thus, the acceptability of communication parameters may be based on collision rate minimization or power consumption minimization (allowing for acceptable numbers of collisions, so as to ensure functionality, however), as desired.

As further examples, the method may determine if the paging slot determined from the first card and the paging slot determined from the second card are the same or adjacent. The method may also determine if the channel number of the first card and the channel number of the second card are different. If both these conditions are met, there may be an unacceptable probability that these two cards (and more specifically, the derived parameters based on the two cards) will conflict when used simultaneously. Similarly, if the communication parameters have the same or adjacent paging slot with different paging channel numbers or different quick paging channel numbers, collisions may occur during simultaneous use. Note that these two scenarios are exemplary only, and the method may utilize any number of specific cases and/or determinations to determine if the two sets of parameters result in conflicts during simultaneous use.

In 208, an indication may be provided which indicates whether the first card and the second card are simultaneously usable by the mobile device. For example, the indication may be provided on a display of the mobile device. Alternatively, the indication could be provided by a computer system, e.g., which includes a card reader to determine compatibilities of cards in single mobile devices for simultaneous usage. Other possibilities of the indication are envisioned. Thus, the above described method may be used in various situations to determine if two different cards or phone numbers are simultaneously usable. For example, the method may be performed when purchasing or selecting a secondary phone number or second card, at a time of purchase of the mobile device, during a configuration of the mobile device, etc.

In 210, the mobile device may be operated. According to various embodiments, the mobile device may operate in a single card mode, e.g., where the first card or second card is only used, e.g., as would be the case for typical single card mobile devices, or in a simultaneous or dual mode, where both cards are capable of being used simultaneously. Thus, in this mode, the mobile device may simultaneously use both the first card and the second card, e.g., by time multiplexing use of the first card and use of the second card using the common hardware of the mobile device (e.g., the single transmitter/receiver).

Note that while the above method is described with respect to two cards, it may be extended to more than two cards. For example, the same method may be applied to determine if three or more cards can be used simultaneously. Thus, the method may further include determining if the first and second cards are compatible with one or more additional cards and then providing an indication of that determination, as desired.

Additionally, the above method may apply to any of various communication protocols. For example, the method may be used for mobile devices which support CDMA or EVDO. In some embodiments, the mobile device may support a first protocol for a first card and a second protocol for a second card, as desired. Thus, the above method may apply to any of various protocols, whether used homogenously or heterogeneously, as desired.

FIGS. 3-11—Further Embodiments

The following descriptions (and FIGS. 3-11) provide various embodiments of the method described in FIG. 2. Note that these embodiments are exemplary only and variations of configurations and processes are envisioned.

As indicated above, when involving the two/more IMSI numbers in the same device (base band), one phone number (IMSI) of the first card may be defined as the primary number and the second phone number (IMSI number) of the second card may be defined as the secondary number. When involving more than two IMSI numbers in the same device (base band), one phone number (IMSI) may be defined as the primary number, the second phone number (IMSI number) may be defined as the secondary number, and the third number and fourth number, and so on. The primary number may always be fixed (e.g., to default or normal values) with no need to change. The method may estimate the resource distribution differences between the primary IMSI and the secondary IMSI (or more IMSI). In one embodiment, the differences may be compared to the predetermined thresholds to determine whether or not the second number (or more phone numbers) is compatible to the primary number. If the result is within the threshold range, the secondary or more IMSIs can be accepted; otherwise, the pairing or secondary phone numbers may be rejected.

Pre-Detection of the Compatibility of Multiple UIM Cards

Pre-detection of the compatibility of a second or more numbers to the primary phone number may be implemented as part of UI, PC, Web, etc. Accordingly, instead of going through the full steps of system acquisition procedure on the selected number, the mobile station can use UI interface or other components to wake up a small portion of the chip or mobile station for calculation (e.g., converting the phone number to UIM number and a hash function may be used to calculate the rest parameters). The results can lead to two results: 1) The selected phone number(s) may be accepted and may go to multiple UIM cards acquisition stage, or 2) The selected phone number(s) may be rejected.

Multiple UIM Cards Initial Acquisition Procedure

To acquire a CDMA system, a mobile station may go through the following states: CMDA system selection state, Pilot channel Acquisition state, Sync channel Acquisition state, System timing changing state and finally, into Mobile Station Idle state. The mobile station may synchronize its long code timing and system timing to those of the CDMA system, using the pliot_PN, LC_STATE, and SYS_TIME values obtained from the received Sync Channel Message (e.g., from the base station).

For the dual UIM cards operation, the primary UIM user may acquire the CDMA network first and obtain CDMA system time, pilot PN offset, and Long Code state. The information obtained from acquiring the primary UIM can directly apply to the secondary UIM initial acquisition without going through the actual initial acquisition procedurals. This is based on the assumption is that the two UIM cards are located at the exact same location, and they should camp to the same strongest base station at the initial acquisition stage.

By entering the idle state, multiple UIM cards may perform registration procedure immediately to inform the base station of their locations, status, identifications, slot cycles and other characteristics so that the base station can efficiently page the mobile station. The registration may be performed first for the primary UIM card and then for the secondary UIM card.

Multiple UIM Mobile Station Operation

Figure 3:
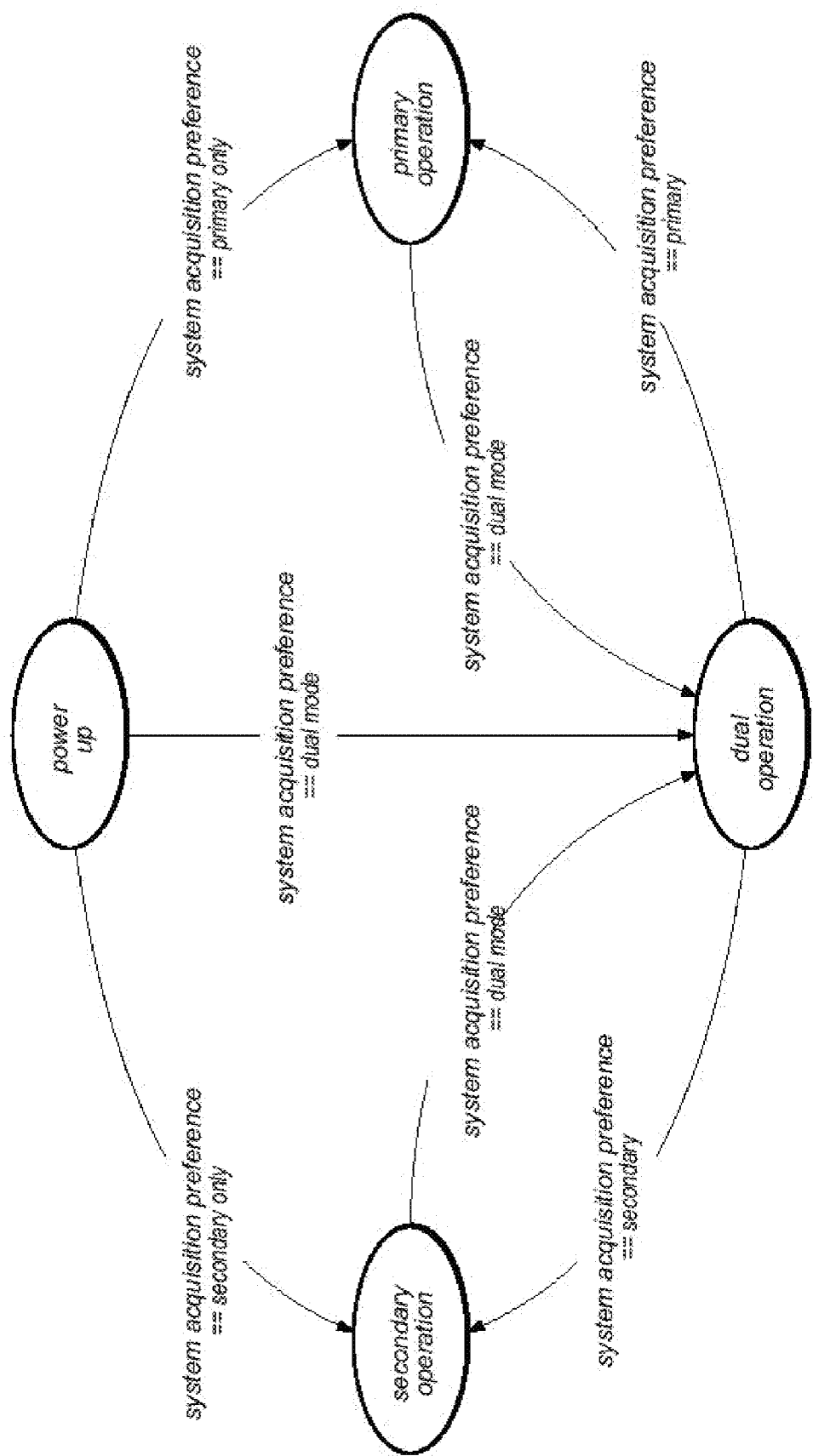

The mobile operation can have three system acquisitions: primary only, secondary only, and dual mode. As shown in FIG. 3, after power up:

If System Acquisition Preference is Primary only, the mobile may transit to Primary IS-2000 1x operation only.

If System Acquisition Preference is Secondary only, the mobile may transit to Secondary IS-2000 1x operation only.

If System Acquisition Preference is dual UIM, the Mobile may transit to dual Primary/Secondary IS-2000 1x operation and may operate according to the methods described herein.

In various embodiments, the user may be able to select among the different modes; for example, using only the primary card, only the second card, or a plurality of the cards (in the case that the two cards compatible, e.g., using the methods described above). Where the two or more cards are incompatible, the user may be able to select which card may be used, e.g., exclusively.

Figure 4:
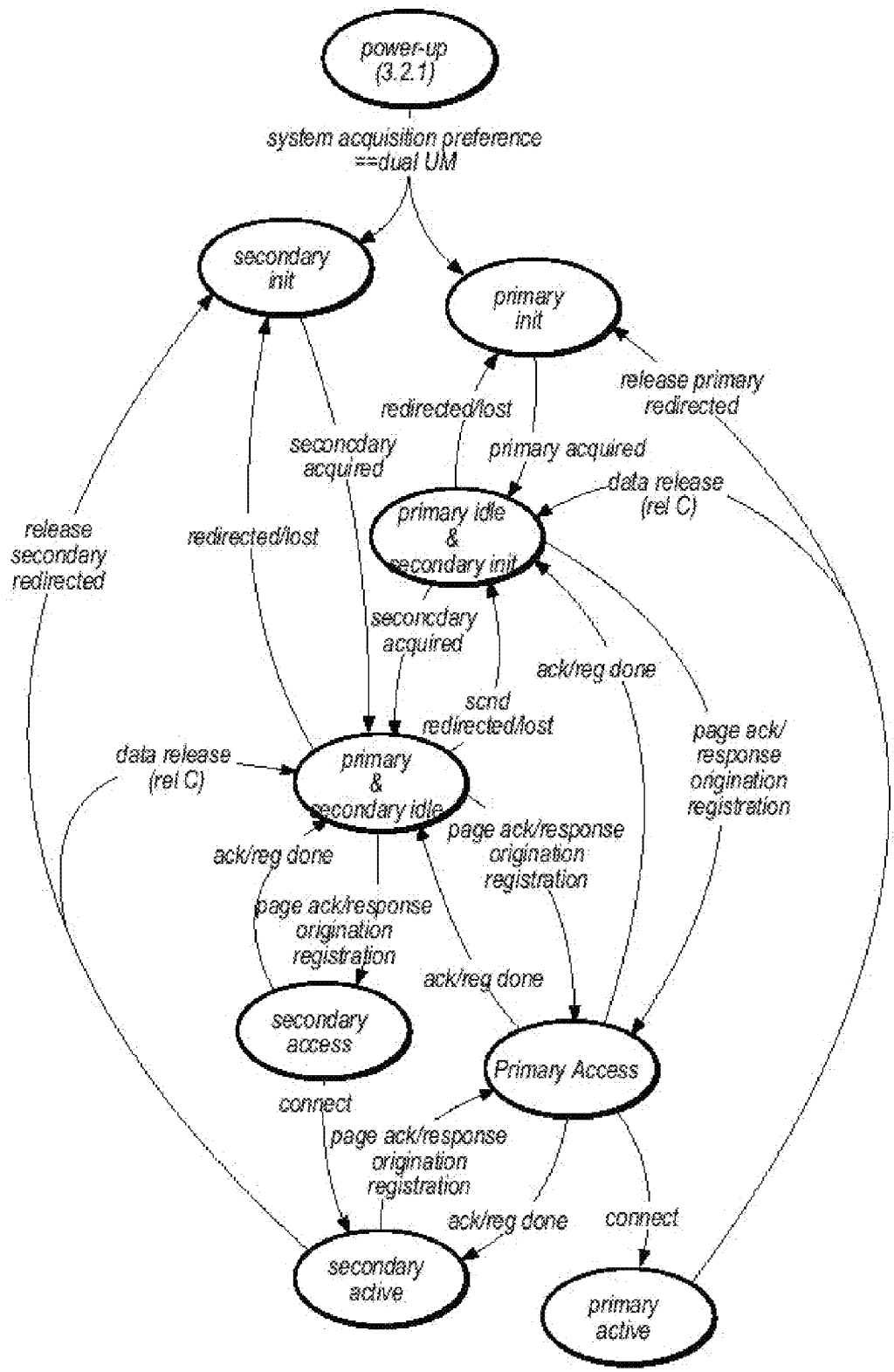

The dual UIM state diagram is given in FIG. 4. As shown, after "power up", if the system acquisition preference is dual UIM, the states may transition to "secondary init" or "primary init". From "secondary init", secondary acquisition may occur to transition to the state "primary & secondary idle". Similarly, from "primary init" upon primary acquisition, the state may be "primary idle & secondary init" which may also transition to "primary & secondary idle" after secondary acquisition. From "primary & secondary idle" the states "secondary access" and "primary access" are available. From these states, "secondary active" and "primary active" are available. Various conditions account for operations that result in state transitions during dual UIM operation.

The Collision Decision Mechanism

Collision decisions for the simultaneous use UIM cards in the same device can be characterized into two groups: minimizing power consumption while allow some percentage of collisions, and sacrificing power consumption while guaranteeing collision rate.

Minimizing Power Consumption while Allow Some Percentage of Collisions

Assumption is that the mobile user can have plenty of choices for choosing a right UIM card (e.g., a hash function is used to calculate the parameters), which have the same PG slot as the primary number with the same CDMA Channel and Paging slot. In this case, at each slot cycle, the mobile may need to wake up only once to receive two or multiple UIM cards information without additional power consumption for updating the second card information. However, during the monitoring stage, the base station can change the CDMA Channel number through overhead messages. Therefore, the same CDMA number cannot always be guaranteed. Collision might happen when the CDMA channel number changes to a different number other than the original number coming from hash calculation.

Sacrifice Power Consumption while Guaranteeing Collision Rate

Figure 5:
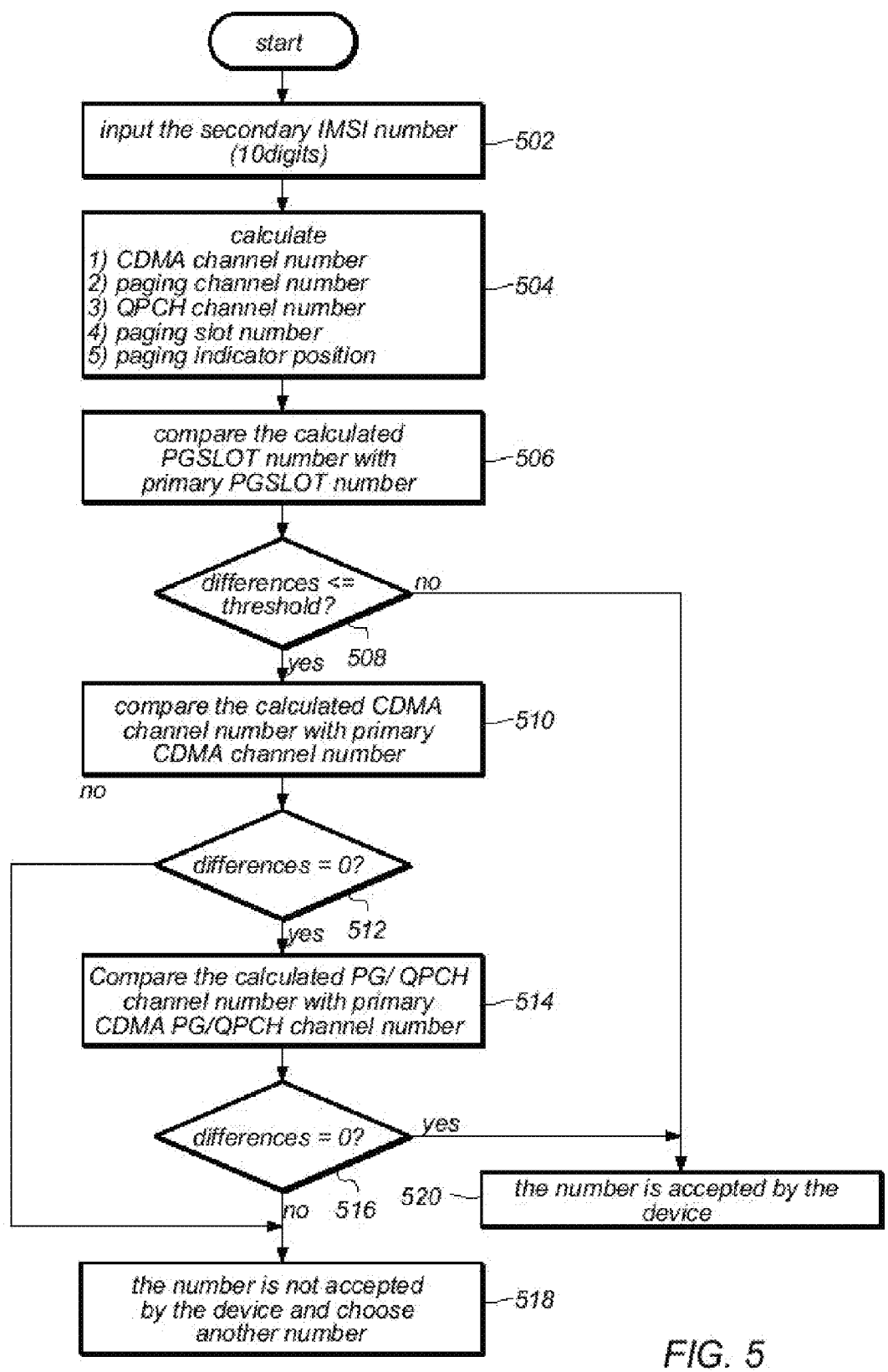

Since the mobile station has no ability to change any assigned resource with a given IMSI, a simple method is to reject cards whose IMSI is not compatible (and/or who is possibly not compatible) with the primary IMSI number and choose other UIM cards that are compatible to the primary number. This method can result in more power consumption compared to the first method, as the mobile station (e.g., the baseband of the mobile station) may need to stay on for a longer time to update the two or more UIM card's information. However, since the two or more cards are apart for delta time from the primary paging slot, this gives each mobile relatively enough decoding time to decode paging/overhead separately. Thus, the resource-sharing problem may no longer be an issue. Theoretically speaking, given the two cards with a paging slot 240 ms (three paging slots 3*80 ms) apart in a slot cycle index 2 (slot cycle 2.56 s is the mostly used slot cycle in real CDMA systems), 94% time, there is no resource-overlapping problem. In other words, the rejection probability in the worst case is around 6%, which may be acceptable. The simulation result shows the collision probability is 0.6% with simulation condition of sweeping 10000 phone numbers with random channel numbers (between 1-10) and paging numbers (1-3) and collision happens 55 times. The decision mechanism is shown in FIG. 5.

As shown, in 502, the secondary MSI number (10 digits) may be received.

In 504, the CDMA channel number, the paging channel number, the QPCH (quick paging channel) number, the paging slot number, and the paging indicator position may be determined.

In 506, the paging slot number from the secondary IMSI may be compared with the primary paging slot number (from the primary IMSI).

If the difference is less than or equal to a threshold, in 508, then the secondary CDMA channel number may be compared with the primary CDMA channel number. If the difference is greater than the threshold, the secondary IMSI/number may be accepted by the device in 520.

From 510, if there is no difference in 512, the number is not accepted by the device and another number may need to be chosen in 518.

However, if there is a difference, the paging channel number and quick paging channel number may be compared with the primary paging channel number and quick paging number. If there is no difference, then the number may not be accepted in 518.

If there is a difference in 512 or 516, the number may be accepted in 520.

Collision Zone

Figure 6:
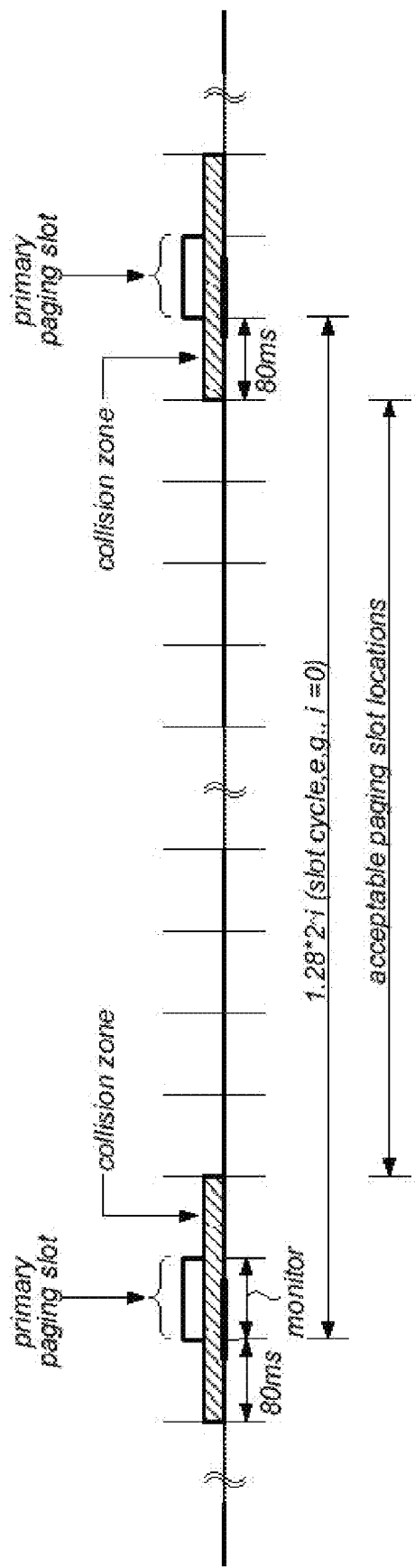

As described above, in order to demodulate at least 1 data frame which indicates that the mobile may go to sleep, the mobile station may need to go through three stages: the re-synchronization stage, monitoring stage, and teardown stage. During the three stages operation plus some cushion time, a mobile station cannot hybrid to any CDMA Channel/Paging Channel number other than its current CDMA Channel/Paging Channel number, otherwise there may be a collision. A collision zone may include the delta slots before the primary paging slot and the delta slots after the primary paging slot, as shown in FIG. 6.

As also indicated above, a hash function may be used to calculate the required parameters which correspond to an IMSI number. Within a collision zone, only two IMSIs with the same CDMA Channel/Paging Channel numbers can be accepted. However, outside of the collision zone, there is no limitation for CDMA Channel number/Paging Channel number. All the resources can be distributed as determined by the hash function since the mobile station may have relatively enough time (depending on the distance between the two IMSI cards, the farther the better) to switch antennas for different frequencies or be able to handle different Wash codes. The distance between the primary paging slot and the secondary paging slot is the main factor of collision confidence level. The distance to the collision zones are defined to fit different requirements. FIG. 6 illustrates exemplary collision zones and acceptable time slots over time. Compatibility may be determined or defined into difference preference levels. One example of such classification is as follows:

1) The most preferred phone number: The selected phone number's paging slot is located at the slot in which the distance to/from the collision zone satisfies the condition: has the largest time space between the two/more collision zones (e.g., delta=<($1.28*2^i/2-1, 1.28*2^i/2, 1.28*2^i/2-1$, i is slot cycle index, given by the base station)>.

2) Preferred phone number: The selected phone number's paging slot is located at the slot in which the distance to/from the collision zone satisfies the condition: has the second largest time space between the two/more collision zones.

3) Acceptable phone number: The selected phone number's paging slot is located at the slot in which the distance to/from the collision zone satisfies the condition: It is outside of the collision zone, but has the smallest time space between two collision zones.

4) Unacceptable phone number: The selected phone number is located at the collision zone.

Threshold Determination

As discussed in the previous section, depending on the design focus point of collision rate versus power consumption, the threshold can be characterized into two groups as well.

Minimizing Power Consumption

The idea of minimizing power consumption is for the two UIM cards to have the same PGSLOT number. To achieve this, the mobile station can sweep all the possible secondary numbers and find numbers that have the same CDMA Channel/Paging Channel as the primary number. The threshold may be set up to measure the candidate UIM cards PGSLOT distance with the primary PGSLOT number and choose the one that has the smallest delta (the same slot or adjacent slot).

Minimizing Collision Rate

As mentioned above, in the CMDA system, the resources may be pre-determined by the given UIM card. Thus, when a collision occurs, it will always occur in future communications and there are no recovery strategies. Therefore, minimizing the collision rate may be a main design goal for the mobile station. To achieve this, the mobile station can sweep all the possible secondary numbers and find numbers that have the same or adjacent PGSLOT number as the primary number. The threshold is set up to measure the candidate UIM cards PGSLOT distance with the primary PGSLOT number and eliminate the numbers within the threshold collision zone, which have the different CDMS Channel or Paging Channels.

Dual UIM Cards Slotted Operation

Assume that mobile acquires both primary and secondary systems. The procedures for monitoring primary paging channel slot and secondary control channel may be determined by the state of the dual mode (as shown in FIGS. 3 and 4): primary only, secondary only, and dual UIM mode. In the dual UIM mode, the mobile may camp on the primary channel and tune to monitor secondary control channels at predetermined time slots. Thus, in the dual UIM mode, the mobile may need to receive both UIM pagings.

Figure 7:
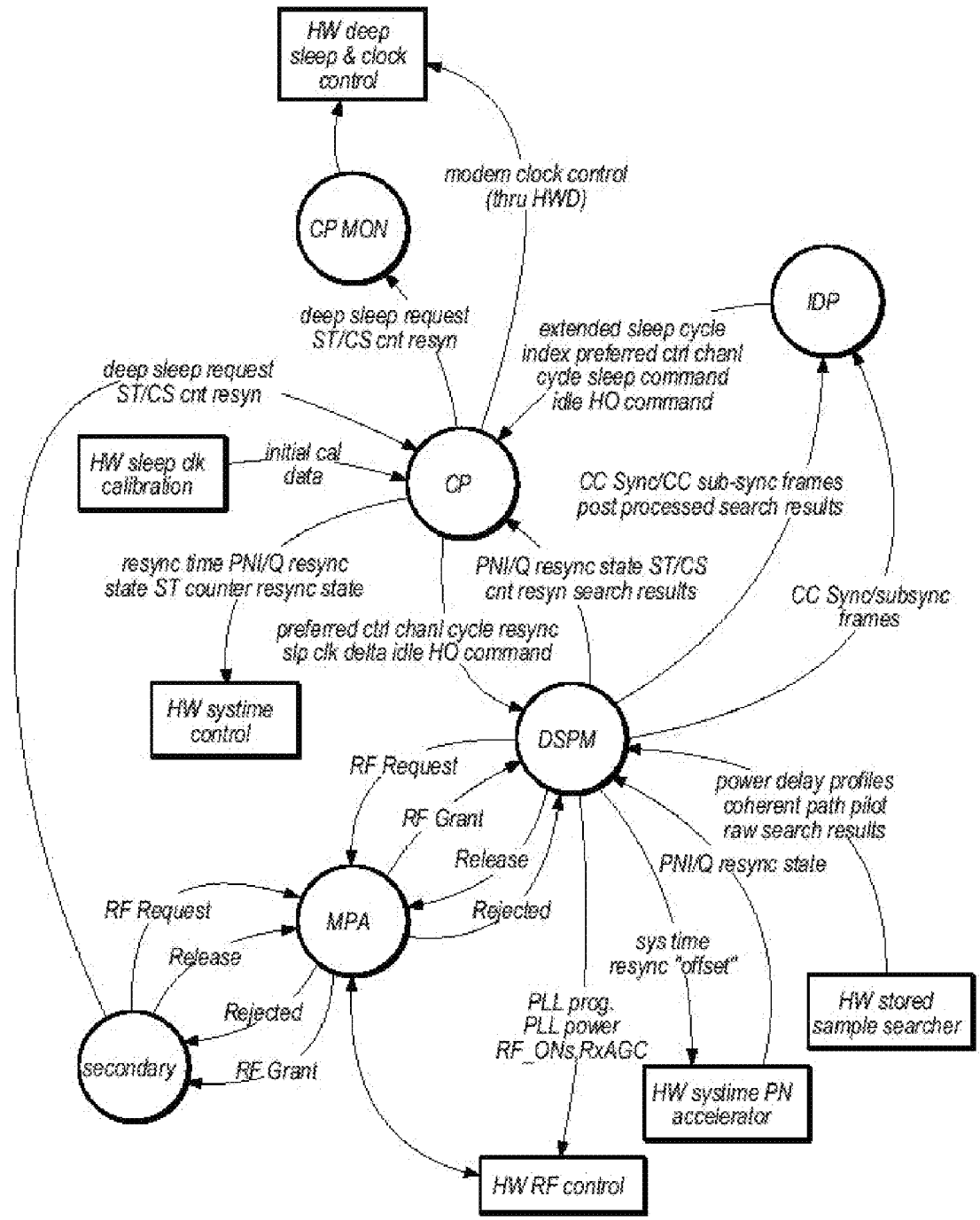

FIG. 7 shows the example of dual UIMs data flow and interactions. As shown, FIG. 7 illustrates a dual UIM mode with general data and control flow between the primary unit and the secondary unit. The resource allocation is distributed among CP MON, MPA, DSPM and 1X Protocol.

CP MON—responsible for determining whether or not the request unit should go to deep sleep. Both primary UIM and secondary UIM systems should send the next resync time along with a deep sleep request to the CP MON. Since CP MON has knowledge of the required wake times for both systems, the time difference between the current time and the desired wake time can be calculated. If the difference is greater then the pre fixed delta (CBP4/6 is 5 ms), CP MON idle test may grant the deep sleep request and shut down all HW and clocks. Otherwise, the chip may stay awake.

MAP—at each wake up occurrence, MAP may be a center unit for handling the resource request from either the primary UIM or Secondary UIM and may determine whether to grant or reject a request according to its priorities. In the dual UIM mode operation, if one of the systems is in an active or traffic state, it may always reject resource requests from another as the system can only support one UIM at time and works on a first come, the first serve basis. When a system releases the resource, it should always inform the MAP so that MAP can maintain the most up to date usage information.

DSPM—responsible for delivering the resources requested by MAP from both UIM systems.

1X_PS—responsible for handling all 1x related messages and resource requests.

Dual UIM Resynchronization Determination

Since dual UIM allows sharing of common (same) hardware, the short code and long code generators may be shared between the two UIM systems. Therefore, it may be necessary to keep track of the two UIMs' system time independently. Moreover, each UIM system's resync parameters calculation may be in reference to its own system time Long Code Hopping In 1X systems, the slot cycles are in durations of $1.28$ s·$2^i$ (i=0, 1, 2, . . . , 7) with a maximum duration of 163 s. The duration of the long code generator is much longer than the duration of the sleep period ($2^{42}/1.2288$ MHz=41.425 days). Since the code generator may be powered down while the mobile station is powered down, it may be necessary to calculate the new state prior to sleep. An efficient way to calculate the long code state is to use a long code generator state prior to sleep to calculate the new state after sleep.

Resync Event

The "Resync" event in the HW may include setting most system time states to a programmed value. The main system time counter (80 ms@9.8304 MHz) and the short code generator as well as long code state may need to be set to some programmed values that correspond to the time at which the Resync occurs.

Prior to going to sleep, CP may calculate the initial state of the PNI, PNQ and system counter at the pre-determined resync time. At resync time, the hybrid sleep control logic may generate a hardware resync interrupt to the system time unit. The resync interrupt may cause a load pulse to the system time unit that may set the counter and PN generators. It may also trigger the RESYNC_INT interrupt to CP.

Dual UIM Slotted Mode Without Contention

In some embodiments, there may be no overlapping wake time between the two systems. The resources may be guaranteed for the both systems when awakened from sleep or upon a request. However, when the delta time between the two wake ups are very close, it may be desirable to let the chip stay awake until the next wake up. By doing this, the amount of time to wake up the ASIC can be saved. In this design, the CPMON may be responsible to grant a deep sleep request. The CPMON may compute the delta time to the next programmed wake up time (can be either Primary UIM or Secondary UIM) when receiving a deep sleep request. If it is greater than the threshold (CPB4.0/6.0 uses 5 ms), the deep sleep request may be granted; otherwise, the chip may stay awake until the next wake up time.

FIG. 8 shows the example of the dual UIM fully slotted time line.

Dual UIM Slotted Mode with Contention

The partial slotted mode may occur when the mobile station is in the dual UIM mode and is active in the network while checking slotted paging for the dual mode UIM card. This may result in a contention between the two systems. In the dual UIM card design, a UIM card which is in the active stage (monitoring) may have higher priority over a UIM system which is in the idle state and waiting for its turn. Therefore, while monitoring a UIM system, another UIM system's wake up request may not be granted. Instead, the SSM module may calculate the UIM's next wake up resync time and may program the resync time into the system time unit and/or the dual mode control unit and then put the UIM system in a sleep state until the resources are released. FIG. 9 illustrates an example of dual UIM resource contention slotted time line.

Figure 10:
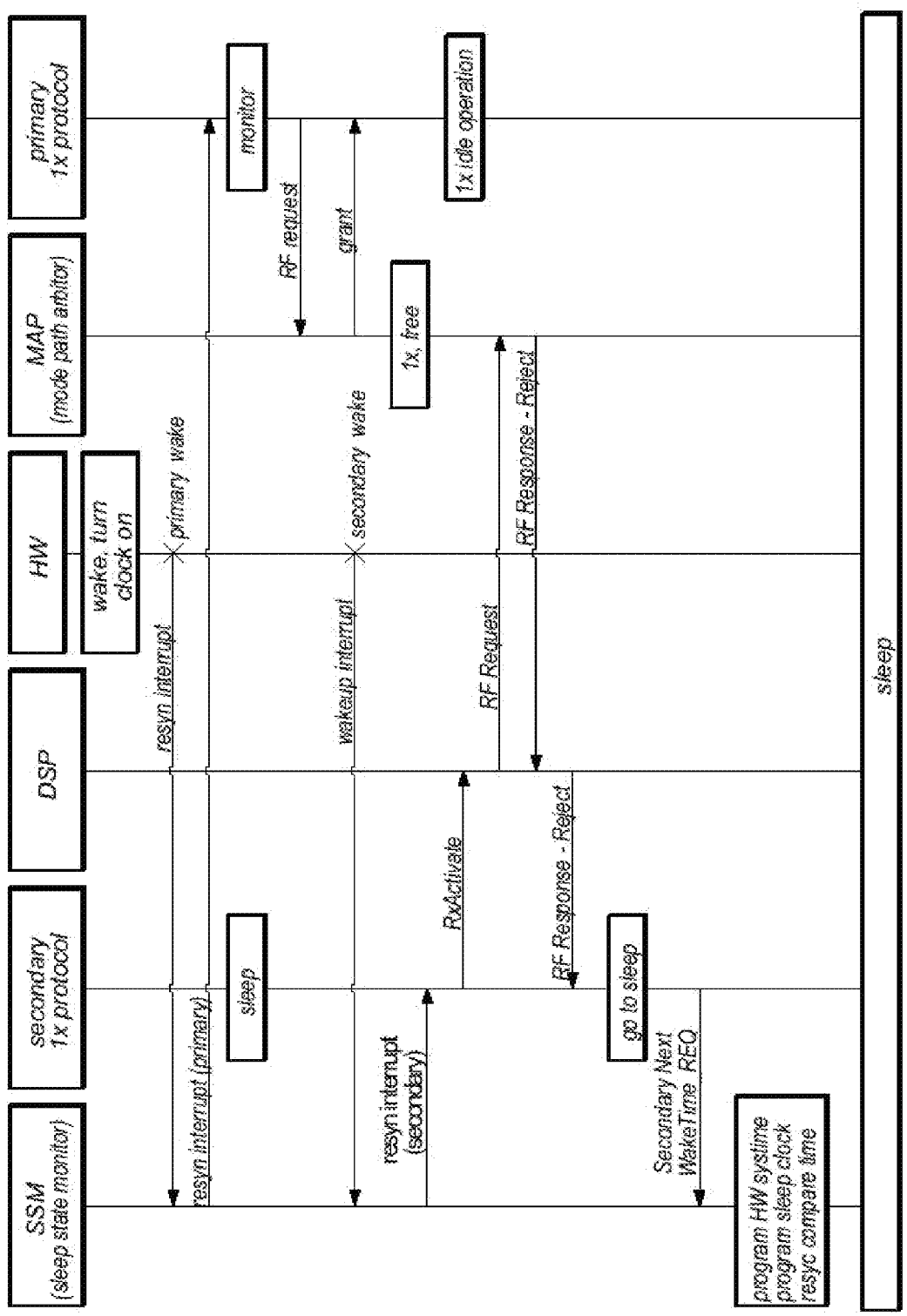

When SSM (Sleep control logic) requests a deep sleep, it may send the predetermined resync time along with the deep sleep request to CP MON so that CP MON can use the timing reference to decide whether or not to grant the request, which may be useful for a hybrid deep sleep request. DSP may be used as the center unit to convey the information between CP and HW. FIG. 10 shows the slotted paging ladder diagram with event of contention between the two systems.

CDMA Slotted Paging Power Up Time Line

Figure 11:
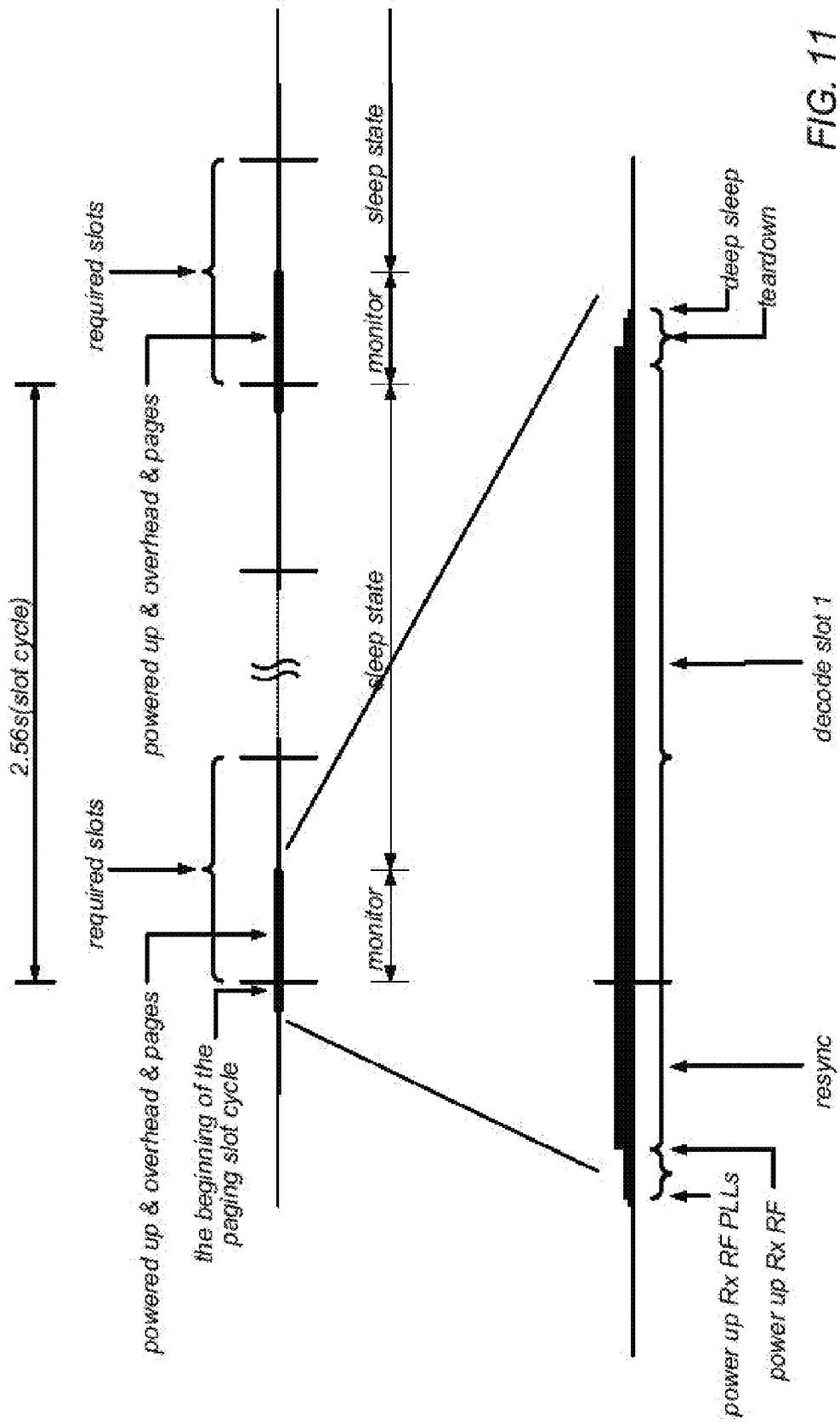

Slotted paging operation may require the mobile station to be awakened at the predetermined paging slot to reacquire the network and monitor the Control Channel at the beginning of the selected control channel cycle. The mobile can return to sleep when the Overhead messages have been updated and a General Page Message is received with an appropriate done bit (e.g., demodulate at least 1 frame (20 ms) of data). In order to monitor the Paging channel or the forward Common control Channel at each start of the slot cycle, the mobile station may need to be powered up earlier than the required slot to perform some necessary housekeeping processes so that at the required time slot, all the information can be lined up for correct decoding. FIG. 11 illustrates the CDMA operation at slotted mode power up requirement and time line. The general wake up time for CDMA slotted system is around 80 ms.

Figure 12:
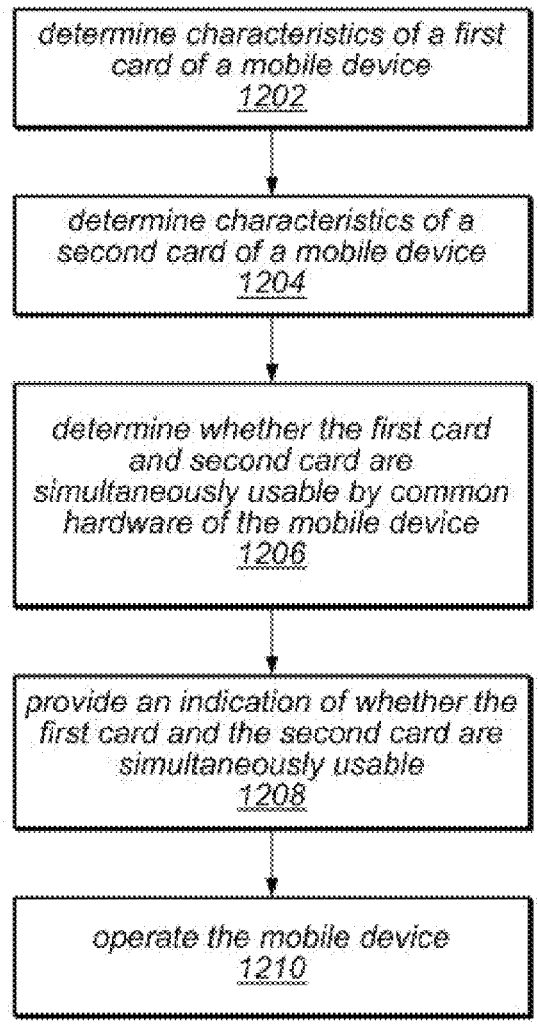
FIG. 12 is a flowchart of an exemplary method for determining communication parameters for two cards in a mobile device, according to one embodiment.

FIG. 12—Determining Compatibility of Multiple Cards in a Mobile Device

FIG. 12 illustrates an exemplary method for determining compatibility of simultaneous use of multiple cards in a mobile device. The method shown in FIG. 12 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1202, signals may be received from a mobile device, e.g., by a base station. For example, the mobile device may attempt to communicate or establish communication with the base station. In various embodiments, the mobile device may send information regarding the various communication capabilities of the mobile device. For example, the signals may indicate that the mobile device is capable of or otherwise requests using a first card (or account associated with the first card) and a second card (or account associated with the second card) simultaneously. Thus, in 1204, the method may determine that the mobile device is capable of (or otherwise requests) using a first card and a second card simultaneously. However, the signals in 1202 may provide further information, such as information regarding the first card and/or the second card. For example, the signals may indicate phone numbers and/or IMSIs associated with the first and second card, although, as described in FIG. 2 above, the IMSIs, in some embodiments, may be determined based on the phone numbers.

In 1206, a plurality of first communication parameters may be determined for the first card. Similar to descriptions above, the communication parameters may be determined via a variety of methods, e.g., based on the IMSI associated with the first card (or account of the first card).

In 1208, a plurality of second communication parameters may be determined for the second card. The plurality of second communication parameters may be determined based on the first communication parameters. More specifically, the plurality of second communication parameters may be determined in order to allow the first card and the second card to be used simultaneously by common hardware (e.g., the baseband, transmitter/receiver, etc.) of the mobile device.

In various embodiments, this may be achieved by deriving communication parameters based on the IMSI of the second card, and if necessary, modifying those parameters to make the communication parameters of the first and second card compatible. Alternatively, the communication parameters may not be based on the IMSI of (or other information received concerning) the second card, but may instead be based on the communication parameters determined for the first card. Thus, the second communication parameters may be determined expressly for ensuring that the first and second cards may be used simultaneously by the mobile device, e.g., based on the indication that the mobile device desires to use or is capable of using the first and second cards simultaneously. For example, the plurality of second parameters may be assigned such that the paging slot and paging channel for the second card are the same as the paging slot and paging channel of the first card. As another example, the IMSI of the first card may be assigned as the IMSI of the second card. More specifically, the system may map the MDN (mobile directory number) of the second card to the IMSI of the first card.

In 1210, the plurality of the first and second communication parameters may be provided to the mobile device. The plurality of the first communication parameters may be usable by the mobile device to communicate using the first card and the plurality of the second communication parameters may be usable by the mobile device to communicate using the second card. Because of the determinations in 1204 and 1206 above, the mobile device may be configured to use the first and second communication parameters to simultaneously use the first and second card (or accounts associated therewith).

Similar to embodiments above, the method may apply to more than two cards in a mobile device. For example, the method may include determining that the mobile device is capable of using the first card, the second card, and one or more additional cards simultaneously, determining associated communication parameters for the one or more additional cards (such that the plurality of cards can be used simultaneously), and providing those parameters to the mobile device. Thus, the method apply to determining any number of sets of communication parameters such that any number of cards may be sued simultaneously by a mobile device. However, such methods could be altered to allow for any subsets of cards to be used simultaneously—e.g., where first and second cards can be used simultaneously and third and fourth cards can be used simultaneously, as desired.

Further Embodiments

The following descriptions provide further embodiments of the method described in FIG. 12. Note that these embodiments are exemplary only and variations of configurations and processes are envisioned.

Implementing processes related to dual/multiple UIM card for a mobile station in the base station may have more advantages than implementing in the mobile station. However, such changes may require changes in the standards used for communication, which may be undesirable.

The Collision Decision Mechanism—the base station can assign the secondary number to the same user according to the user's primary number. Since the base station has the knowledge of frequency/wash allocation, it can prevent the possible collision by avoiding the IMSI's which have potential conflicts with the primary number. Moreover, the base station can choose a particular number that has the same paging slot as the primary number.

Advantage Over Mobile Station Embodiments—Power Saving

The base station can select a secondary number in such a way that the primary and secondary numbers happen to have the same paging slot number with a common CDMA Channel Number and Paging Channel Number. In this way, the mobile can have the power consumption of a single user while supporting two UIMs simultaneously.

Scheduling

The mobile station may only need to wake up once to decode paging or control channel messages that address both of the IMSIs. No handling of the switch between the two IMSI is needed.

Additional Embodiments

Multiple UIM Cards in Hybrid 1xRTT and 1xEV-DO System

Figure 13:
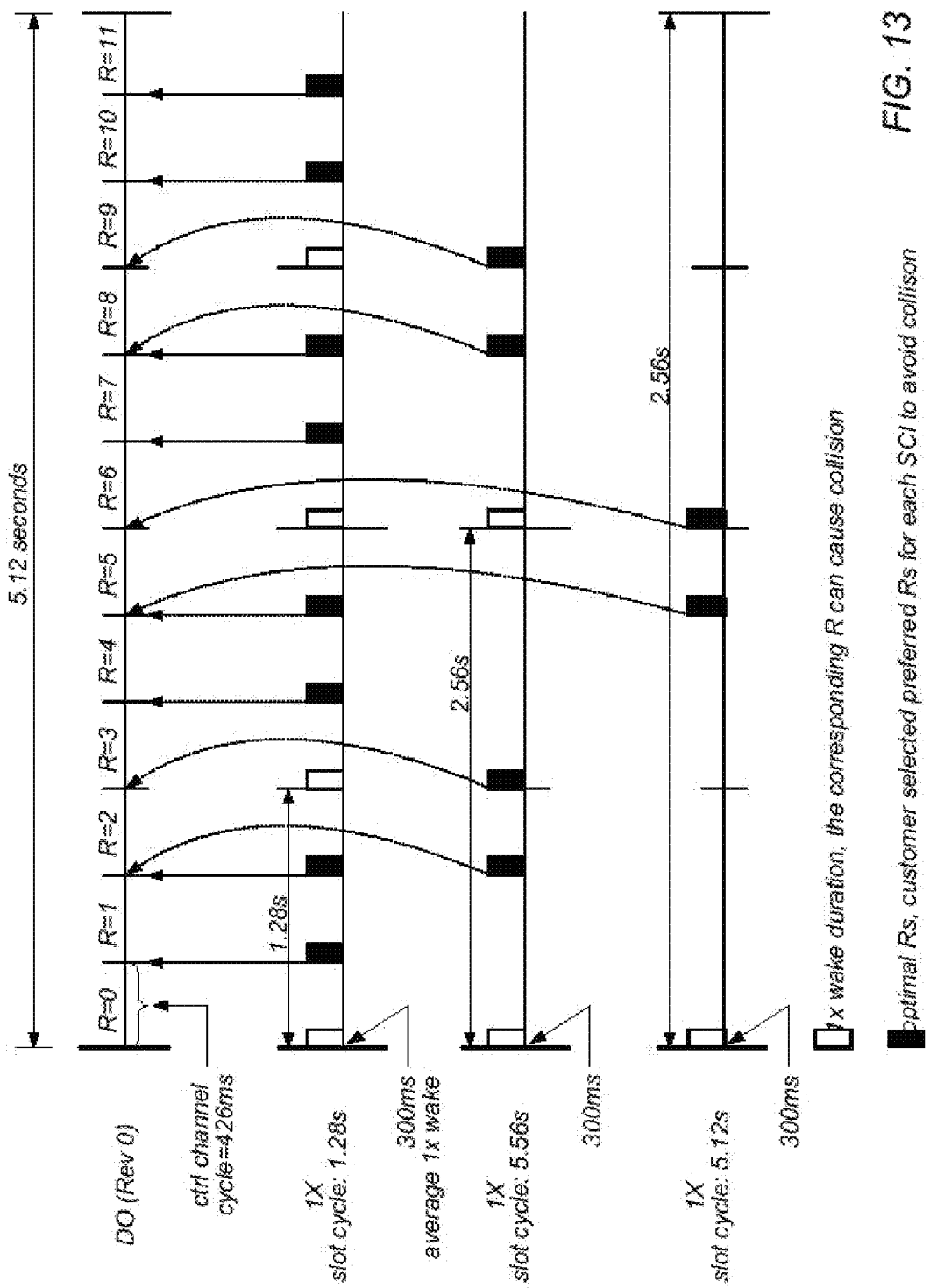
FIG. 13 is an exemplary diagram corresponding to the method of FIG. 12, according to one embodiment.

Unlike 1x mode operation where the paging slot number and slot cycle are pre-fixed and mobile stations have no option to change it, in the DO system, the preferred control channel cycle is negotiable as the AN is not aware of the 1x slot cycle in use. Thus, the AN may have to accept the PCCC (preferred control channel cycle) proposed by the mobile station. FIG. 13 shows Rev 0, hybrid control channel preferred cycle determination.

Multiple UIM Card with Primary EVDO Card

Fix the EVDO PCCC with primary UIM card—The average time needed to decode a good frame is around 80 ms~100 ms. In QPCH mode, the paging indicators may be within 100 ms before the paging channel frame. Therefore, to avoid collision, the normal paging and QPCH may be combined together to give some delta time between 1X and EVDO wake up time, e.g., which may be set to 300 ms. During the 300 ms time zone, any DO scheduled wake up may be considered overlapping with 1X and may be rescheduled to a new time that will not conflict with 1X.

In order to compare both system wake up times at the same scale, we express both systems in terms of 1.667 ms slot durations. The wake up time for 1X can be expressed as follows:

$$MS_{slot}=48\times mod(PGSLOT,16\times 2^i)+48\times k\times 16\times 2^i$$

Where k is the number of the 16×2i slot cycles since the beginning of the system time.

In QPCH mode, the collision may be considered with the first indicator position as this is quite complicated when considering the possibilities of wake up on second paging indicator. Additionally there is not enough time between the two indicators to decode control channel capsule.

$$MS_{slot}=48\times mod(PGSLOT,16\times 2^i)+48\times k\times 16\times 2^i////////$$

The wake up time for DO can be expressed as follows:

$$AT_{slot}=256\times mod(R,12)+256\times j\times 12+offset$$

Selecting the Secondary UIM Card which is not Overlapping with Primary UIM

The same method that is used to select secondary UIM can be applied to EVDO/Primary/Secondary UIM selection. The difference is that the selected UIM has to satisfy the sufficient space from both 1x primary UIM and EVDO system.

Multiple EVDO Cards with Primary UIM Card

After determining the primary EVDO PCCC which is compatible with the selected 1x Primary UIM card, using methods such as those described above, the mobile station can calculate the most preferred secondary EVDO PCCC number which should not overlap with either Primary EVDO or Primary 1x UIM. The selected Secondary PCCC can be assigned to the user by negotiating the preference with the AN at session set up stage.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method of a mobile device for wirelessly communicating with a base station, comprising:
   receiving a first parameter set of a first subscriber and a second parameter set of a second subscriber;
   receiving a plurality of signals from the base station, wherein said plurality of signals is configured to indicate communication parameters between the mobile device and the base station, and wherein said plurality of signals indicates a common communication parameter among the first subscriber and the second subscriber selected from the following:
   a system time of the base station;
   a pilot PseudoNoise (PN) offset and
   a long code state;
   calculating a plurality of communication parameters for the first parameter set and the second parameter set according to the plurality of signals; and
   communicating with the base station in accordance with the plurality of communication parameters for representing the first subscriber and the second subscriber, wherein the plurality of communication parameters indicates a wireless communication resource in a time multiplexing fashion.

2. The method of claim 1, wherein the first parameter set is converted by a first subscriber number of the first subscriber, wherein the second parameter set is converted by a second subscriber number of the second subscriber.

3. The method of claim 1, wherein the plurality of communication parameters comprises a paging channel number and a Code Division Multiple Access (CDMA) signaling channel number.

4. The method of claim 1, wherein the plurality of communication parameters is calculated in response to a diversity of the wireless communication resource in the time multiplexing fashion is larger than a threshold for reducing collision rate of the wireless communication resource.

5. The method of claim 4, wherein the diversity is related to any items of the following:
   paging channel numbers corresponding to the first subscriber and the second subscriber; and
   Code Division Multiple Access (CDMA) signaling channel numbers corresponding to the first subscriber and the second subscriber.

6. The method of claim 1, wherein the plurality of communication parameters is calculated in response to a diversity of the wireless communication resource in the time multiplexing fashion is less a threshold for reducing power consumption of the mobile device.

7. The method of claim 1, further comprising calculating a wake-up period of the mobile device according to the plurality of communication parameters, wherein the wake-up period is related to a diversity of the wireless communication resource in the time multiplexing fashion.

8. The method of claim 7, further comprising keeping the mobile device awake during the wake-up period in response to the wake-up period is shorter than a threshold.

9. The method of claim 1, further comprising when the mobile device is awake and communicating with the base station through the first parameter set, the second parameter set is idle, and when the mobile device finishes communicating with the base station through first parameter set, the mobile device receives a resynchronization interrupt in response to the second parameter set.

10. The method of claim 9, wherein the resynchronization interrupt is configured to reset a time counter and a code generator.

11. An apparatus for wirelessly communicating with a base station, comprising:
   a parameter receiver for receiving a first parameter set of a first subscriber and a second parameter set of a second subscriber;
   a signal receiver for receiving a plurality of signals from the base station, wherein said plurality of signals is configured to indicate communication parameters between the apparatus and the base station, wherein said plurality of signals indicates a common communication parameter among the first subscriber and the second subscriber selected from the following:
   a system time of the base station;
   a pilot PseudoNoise (PN) offset and
   a long code state;
   a calculator for calculating a plurality of communication parameters for the first parameter set and the second parameter set according to the plurality of signals; and
   a communication module for communicating with the base station in accordance with the plurality of communication parameters for representing the first subscriber and the second subscriber, wherein the plurality of communication parameters indicates a wireless communication resource in a time multiplexing fashion.

12. The apparatus of claim 11, wherein the first parameter set is converted by a first subscriber number of the first subscriber, and wherein the second parameter set is converted by a second subscriber number of the second subscriber.

13. The apparatus of claim 11, wherein the plurality of communication parameters comprises a paging channel number and a Code Division Multiple Access (CDMA) signaling channel number.

14. The apparatus of claim 11, wherein the plurality of communication parameters is calculated in response to a diversity of the wireless communication resource in the time multiplexing fashion is larger than a threshold for reducing collision rate of the wireless communication resource.

15. The apparatus of claim 14, wherein the diversity is related to any items of the following:
   paging channel numbers corresponding to the first subscriber and the second subscriber; and
   Code Division Multiple Access (CDMA) signaling channel numbers corresponding to the first subscriber and the second subscriber.

16. The apparatus of claim 11, wherein the plurality of communication parameters is calculated in response to the diversity of the wireless communication resource in the time multiplexing fashion is less a threshold for reducing power consumption of the apparatus.

17. The apparatus of claim 11, further comprising calculating a wake-up period of the apparatus according to the plurality of communication parameters, wherein the wake-up period is related to a diversity of the wireless communication resource in the time multiplexing fashion.

18. The apparatus of claim 17, further comprising keeping the apparatus awake during the wake-up period in response to the wake-up period is shorter than a threshold.

19. The apparatus of claim 11, further comprising when the apparatus is awake and communicating with the base station through the first parameter set, the second parameter set is idle, and when the apparatus finishes communicating with the base station through the first parameter set, the apparatus receives a resynchronization interrupt in response to the second parameter set.

20. The method of claim 19, wherein the resynchronization interrupt is configured to reset a time and a code generator.

21. A system for operating in CDMA mode, the system comprising:
   a base station for receiving a first parameter set and a second parameter set;
   a mobile device for wirelessly communicating with the base station, further comprising:
   a parameter receiver for receiving the first parameter set of a first subscriber and a second parameter set of a second subscriber;
   a signal receiver for receiving a plurality of signals from the base station, wherein said plurality of signals is configured to indicate communication parameters between the mobile device and the base stations, and wherein said plurality of signals indicates a common communication parameter among the first subscriber and the second subscriber selected from the following:
   a system time of the base station;
   a pilot PseudoNoise (PN) offset and
   a long code state;
   a calculator for calculating a plurality of communication parameters for the first parameter set and the second parameter set according to the plurality of signals; and
   a communication module for communicating with the base station in accordance with the plurality of communication parameters for representing the first subscriber and the second subscriber, wherein the plurality of communication parameters indicates a wireless communication resource in a time multiplexing fashion.

22. A method of a mobile device for wirelessly communicating with a base station, comprising:
   receiving a first parameter set of a first subscriber and a second parameter set of a second subscriber;
   receiving a plurality of signals from the base station, wherein said plurality of signals is configured to indicate communication parameters between the mobile device and the base station; and wherein said plurality of signals indicates a common communication parameter among the first subscriber and the second subscriber selected from the following:
a system time of the base station;
a pilot PseudoNoise (PN) offset and
a long code state;
calculating a plurality of communication parameters for the first parameter set and the second parameter set according to the plurality of signals; and
communicating with the base station in accordance with the plurality of communication parameters for representing the first subscriber and the second subscriber, wherein the plurality of communication parameters indicates a wireless communication resource in a time multiplexing fashion;
wherein the plurality of communication parameters is calculated in response to a diversity of the wireless communication resource in the time multiplexing fashion is less a threshold for reducing power consumption of the mobile device.

* * * * *